May 14, 1968     H. E. FIALA     3,383,624
AUTOTRANSFORMER POWER SUPPLY
Filed March 31, 1965     3 Sheets-Sheet 1
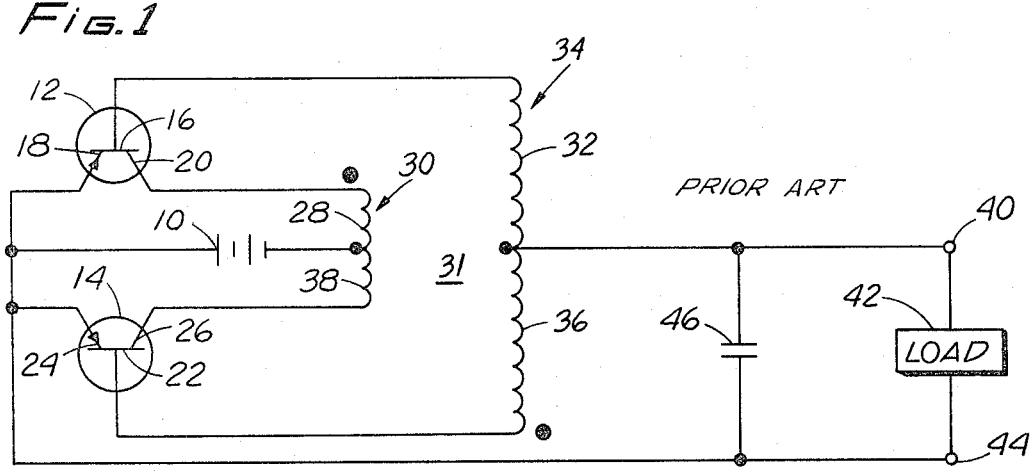
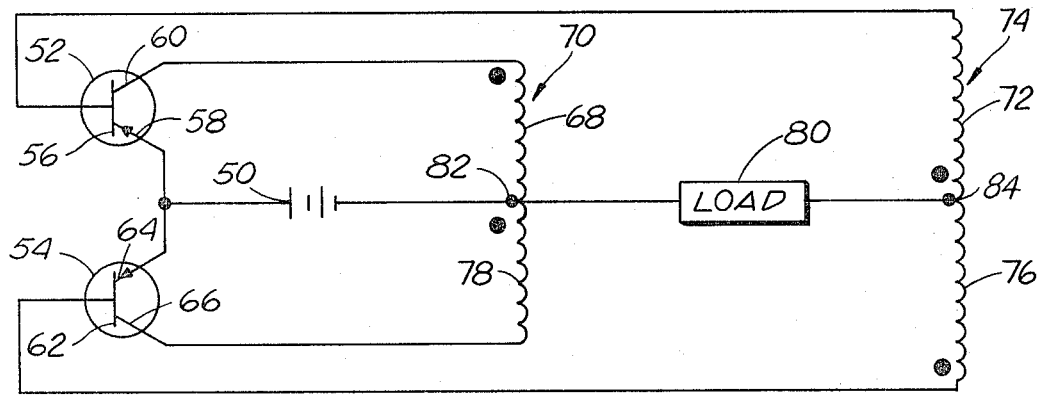
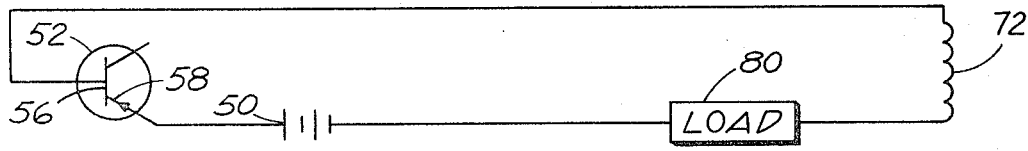
INVENTOR.
HARVEY E. FIALA
BY
Sidney Magnes
AGENT

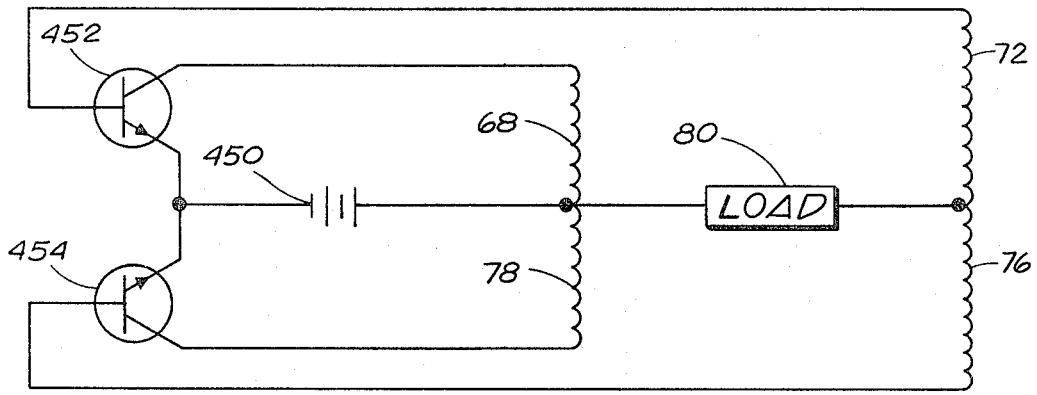
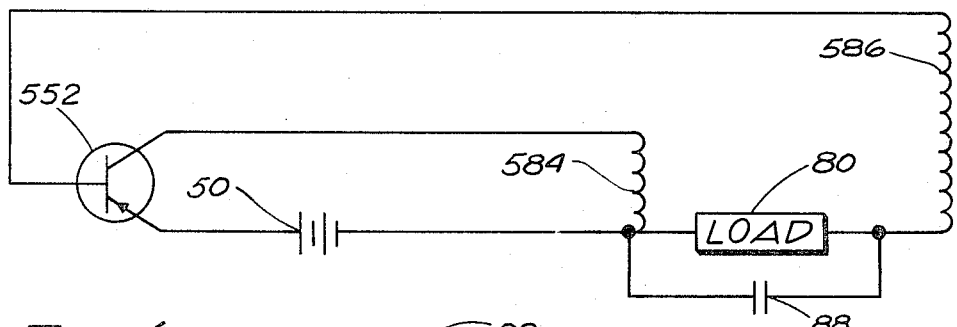
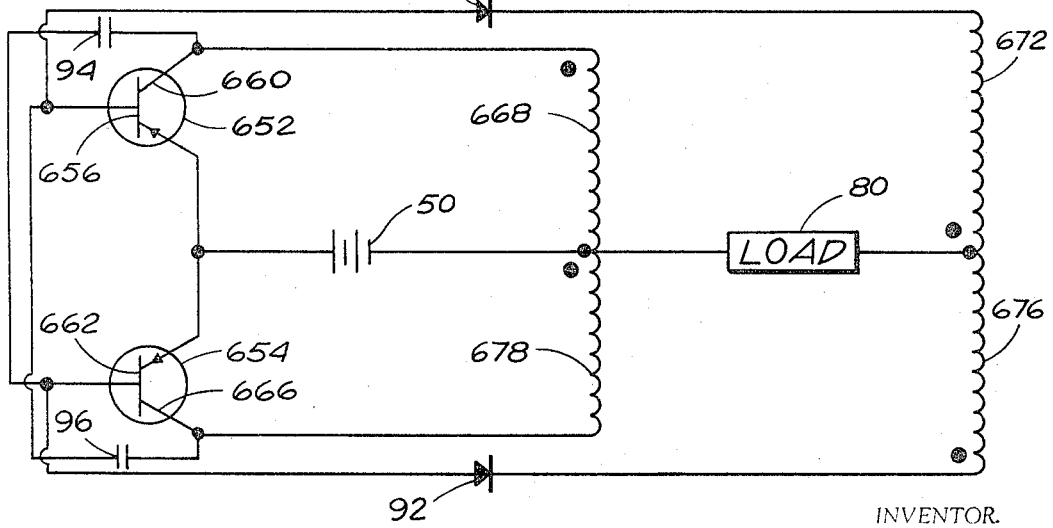
INVENTOR.
HARVEY E. FIALA
BY Sidney Magness
AGENT

May 14, 1968        H. E. FIALA        3,383,624

AUTOTRANSFORMER POWER SUPPLY

Filed March 31, 1965        3 Sheets-Sheet 3

INVENTOR.
HARVEY E. FIALA

BY
Sidney Magnes
AGENT

United States Patent Office 3,383,624
Patented May 14, 1968

3,383,624
AUTOTRANSFORMER POWER SUPPLY
Harvey E. Fiala, Downey, Calif., assignor to North American Rockwell Corporation, a corporation of Delaware
Filed Mar. 31, 1965, Ser. No. 444,311
15 Claims. (Cl. 331—113)

ABSTRACT OF THE DISCLOSURE

A power-supply comprising an electronic transistorized oscillator whose output may be AC and/or DC signals of desired magnitude. An "autotransformer" type of circuitry permits the battery voltage to be added to the transformer voltage, so that the transformer requirements are minimized, and the ripple of the output voltage is minimal. The output voltage is used to "condition" the transistors; and circuitry is shown for protecting the transistors from excessively high conditioning voltages.

Introduction

In many present-day electrical and electronic systems, it is extremely important to have "power-supplies" of high reliability, high efficiency, and light weight. Generally speaking, low-voltage batteries are readily available; but the power-supplies must convert the low-voltage D.C. from the battery to a high-voltage D.C.—and must frequently also provide a high-voltage A.C. For example, some applications require a high-voltage A.C. or D.C. signal for initiating operation; and then requires a high-voltage D.C. signal for continuous operation. Despite the availability of some transistorized power-supplies that approach the above requirements, there is an ever-increasing need for ever-better power-supplies.

Objects and drawings

It is therefore an object of the present invention to provide a compact power-supply having a very high efficiency and a high reliability.

It is another object of the present invention to provide a power-supply having a low "ripple" voltage.

Figure 7:
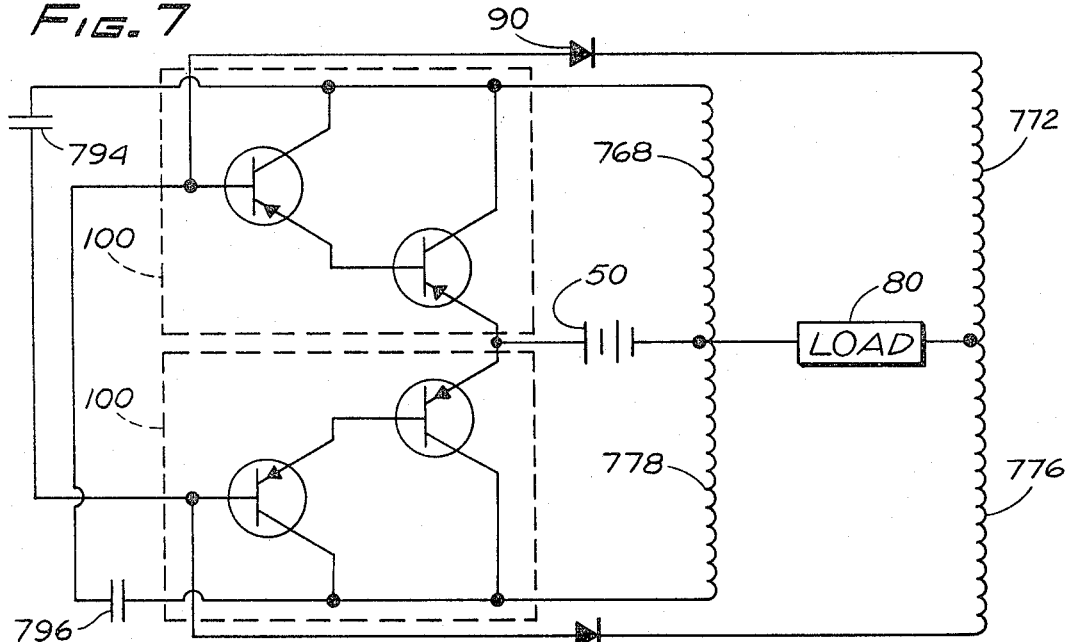
Figure 8:
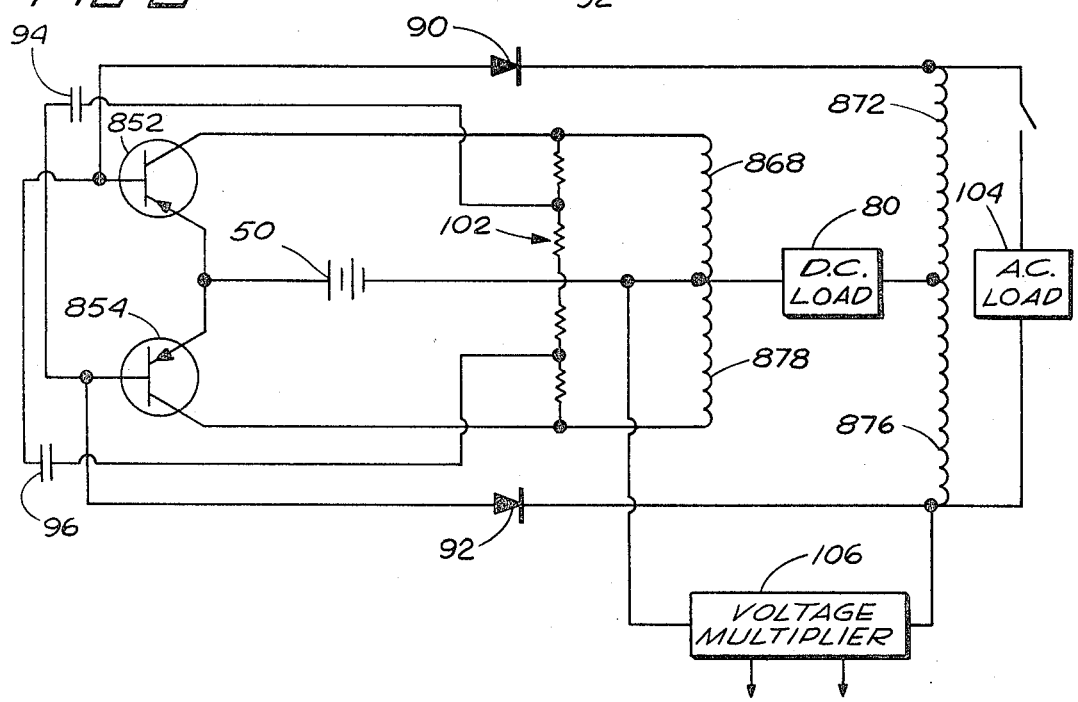

The attainment of these objects and others will be realized from the teachings of the following specification, taken in conjunction with the drawings of which:

FIGURE 1 shows a prior-art circuit;
FIGURE 2 shows a circuit employing the inventive concept using PNP transistors;
FIGURE 3 shows the autotransformer-effect;
FIGURE 4 shows the basic inventive concept using NPN transistors;
FIGURE 5 shows a one-transistor embodiment;
FIGURE 6 shows an embodiment for producing high voltages;
FIGURE 7 shows an embodiment for producing high gain; and
FIGURE 8 shows an embodiment for producing high-voltage D.C., A.C. and a square-wave waveform.

Synopsis

Broadly speaking, the present invention comprises an electronic circuit of the converter type, that produces high-frequency oscillations. The load is connected in such a way that the load current conditions the circuit's transistor in accordance with the load conditions, thus providing extremely high efficiency over a wide range of load changes. Furthermore, the circuit configuration is such that a minimal amount of power is handled by the transformer.

The prior-art

FIGURE 1 shows a prior-art transistorized power-supply circuit whose advantages and disadvantages will be realized from the following description of its operation. A circuit of this type is shown in U.S. Patent No. 3,149,291 to R. P. Massey. In the prior art circuit of FIGURE 1, a battery 10 applies an operating potential of suitable polarity to each of two transistors, 12 and 14; transistor 12 having a base-electrode 16, an emitter-electrode 18, a collector-electrode 20, an emitter-collector path; and an emitter-base path; and transistor 14 having a base-electrode 22, an emitter-electrode 24, a collector-electrode 26, an emitter-collector path, and an emitter-base path. Due to battery 10, both transistors are on the verge of conducting; but one of them will begin to conduct before the other. Assume for the moment that transistor 12 becomes conductive first. The following sequence of events then occurs. Electricity flows from battery 10, to emitter 18, through the emitter-collector path, out of collector 20, through the upper portion 28 of primary winding 30, and back to the battery. The build-up of this flow of electricity has three results. First of all it induces a voltage in the upper portion 32 of secondary winding 34. As indicated by the dot convention, the voltage induced in the upper portion of secondary winding 34 is of such polarity that it makes the base-electrode 16 of PNP transistor 12 negative, thus causing transistor 12 to become more conductive. The increased conductivity causes a larger current-flow through the upper portion of primary winding 30, and thus induces a larger voltage in the upper portion of the secondary winding—this induced voltage making base-electrode 16 even more negative, and making transistor 12 still more conductive. This is called "positive-regeneration," and quickly causes transistor 12 to become fully conductive.

The second effect of the electric-current flow through the upper portion 28 of primary winding 30 is that it induces a voltage in the lower portion 36 of the secondary winding 34; the voltage induced in the lower portion 36 being of such a polarity—as indicated by the dot convention—that is applies a positive voltage to base-electrode 22 of PNP transistor 14; this positive-polarity voltage cutting off transistor 14.

The third effect of the electric current flow through the upper portion 28 of primary winding 30 is that it induces a current flow through the lower portion 38 of the primary winding 30; the voltage induced in the lower portion of the primary winding being of such a polarity—as indicated by the dot convention—that it applies a negative voltage to the collector-electrode 26 of PNP transistor 14; this negative-polarity voltage also cutting off transistor 14.

Thus, as a result of the regeneration and these effects, transistor 12 quickly becomes fully conductive, and transistor 14 remains or quickly becomes non-conductive.

If transistor 14 had happened to become conductive first, an analysis of the circuit would show that it would have become fully conductive, while the other transistor would have remained or become cut-off.

As the circuit attains the above conditions, the current distribution is as follows. Current from battery 10 flows to emitter 18, where it splits. Some of the split current flows from emitter 18 through collector 20 and the upper portion 28 of primary winding 30, and then back to battery 10. The load portion of the current flows from emitter 18, through the emitter-base path, out of base-electrode 16, through the upper portion 32 of secondary winding 34, to output terminal 40, through load 42, to output terminal 44, and then back to emitter 18. Thus, the upper portion 32 of secondary-winding 34 is the source of potential for the load current; and the battery does not contribute directly to the load voltage, and is not part of the load circuit.

As the rapidly-increasing current flows through the windings of transformer 31, the core of transformer 31 becomes saturated. The core is preferably formed of so-called "square-loop" material; and as the core approaches saturation, its impedance decreases, and the current-flow approaches a maximum value—as limited by the resistances of the battery, transistor 12, and the windings. As this current reaches its maximum value, it produces an effectively collapsing magnetic field, and therefore induces voltages of the opposite polarity in the lower half of the primary winding, and in the two halves of the secondary winding. These reversed-polarity voltages cause transistor 14 to conduct, and to cut off transistor 12 as follows. In connection with transistor 14, its base is now down-volted by the negative-polarity voltage induced in the lower half of the secondary winding, and its collector is up-volted by the positive-polarity voltage induced in the lower half of the primary winding; thus turning-on transistor 14. Simultaneously the upper half of the secondary winding applies a positive-going cut-off potential to the base of transistor 12. This is also a form of positive regeneration, and provides extremely rapid switching of the conductivity from one transistor to the other. Thus, the formerly-conductive transistor 12 is quickly cut off, and the formerly non-conductive transistor 14 is quickly caused to conduct. Under this condition, the load current now flows from emitter 24, through the emitter-base path, out of base 22, through the lower portion 36 of the secondary winding 32, to output terminal 40, through load 42, to output terminal 44, and back to the battery. Again, the lower-portion 36 of secondary-winding 34 is the source of potential for the load current; and the battery does not contribute directly to the load voltage, and is not part of the load circuit.

As previously discussed, the rapidly-increasing current soon saturates the core of the transformer; opposite-polarity voltages are induced; and transistor 12 soon becomes conductive, while transistor 14 is cut off. Thus, the conduction cyclically switches, or oscillates, between the two transistors, at a rate determined by circuit parameters.

It will be noted that regardless of which transistor is conducting, load current always flows through load 42 from output terminal 40 toward output terminal 44. Thus, the load-current flows in the same direction; that is, it is a direct current. Moreover, the voltage across the load is a function of the secondary winding 34, which is in turn a function of the winding-ratio of the transformer. Thus, the load receives high-voltage D.C.; and the high-frequency of switching, aided by the smoothing operation of capacitor 46, provides a satisfactory D.C. power-supply.

This prior-art circuit, however, has the following disadvantages. Firstly, each half of the secondary-winding 34 develops the desired load voltage, and carries the complete load current. Secondary-winding 34 therefore has the same power-rating as the load; and, because of the transformer relationship, the primary-winding must have the same power-rating. Transformer 31 must therefore be a relatively heavy-duty component, and—because of its relatively large power-rating—the transformer must have a large core, which makes it relatively bulky and expensive, and introduces a relatively large so-called "core-loss." Secondly, between oscillations, the output voltage tends to drop from its maximum value to zero; so that the "ripple" voltage tends to vary from zero volts to the maximum voltage occurring at output terminal 40. Thirdly, the winding-ratio of the transformer must be such that the battery voltage is stepped up to the desired output voltage; that is, if the battery provides 28 volts, and the desired load-voltage is 42 volts (50% higher), the step-up ratio must be 42:28, or 1.5:1. Finally, the capacitor 46 always acts as a load, and thus lowers the overall efficiency.

Thus, this prior-art power-supply has definite disadvantages.

Description of the invention

A circuit embodying the inventive concept is shown in FIGURE 2. This comprises a battery 50 and two transistors 52 and 54, shown as PNP transistors. Transistor 52 comprises a base-electrode 56, and emitter-electrode 58 and a collector-electrode 60; and transistor 54 comprises a base-electrode 62, and emitter-electrode 64 and a collector-electrode 66. The operation of the circuit of FIGURE 2 is similar to that previously discussed, except for the manner in which the battery, transformer, and the load co-act in the circuit. It should be noted, that in this circuit, the load is connected between the center-taps of the primary and secondary windings 70 and 74 respectively; center-tap points 82 and 84 serving as the output terminals to which the load is connected. This makes a tremendous difference, as will be seen later.

In operation, when transistor 52 is conductive, the current-flow through the upper portion 68 of the primary winding 70 induces the voltage in the upper portion 72 of secondary winding 74 in the same manner as previously-described, this voltage acting to cause regenerative action of transistor 52, and thus causing transistor 52 to quickly become fully conductive. Similarly, the flow of current through the upper portion of the primary winding induces a voltage in the lower portion of the secondary winding, this induced voltage having a positive polarity that is applied to the base-electrode 62 of PNP transistor 54, thus cutting off transistor 54. Simultaneously, the current flowing through the upper portion 70 of the primary winding 68 induces a voltage in the lower portion 78, this negative-going voltage being applied to collector-electrode 66 of transistor 54, and acting to cut off PNP transistor 54. Moreover, as in the previously-described prior-art circuit, the operation is such that the conductivity oscillates between the two transistors.

In the circuit of FIGURE 2, the current from battery 50 flows to emitter 58, whereupon it splits. Some of the split current flows from emitter 58 through collector 60 and the upper portion 68 of the primary winding 70, and then back to the battery 50. Another portion—the load-current—flows from emitter 58 to base-electrode 56, through the upper portion 72 of the secondary winding 74, and then through the load 80 to the battery 50.

A similar operation occurs when transistor 54 is conducting, namely the current from the battery 50 flows to emitter-electrode 64 whereupon it splits, some of it flowing through collector-electrode 66 and the lower half 78 of the primary winding; and the load-current flowing from emitter-electrode 64 through the base electrode 62, through the lower half 76 of secondary winding, and then through the load 80 back to battery 50.

As in the previously-described prior-art circuit, the load current always flows in the same direction; that is, it is a direct current.

It should be noted that in the present invention—unlike the prior-art circuit—the battery is part of, and thus aids in the production of the load voltage, and is part of the load circuit, resulting in an autotransformer-effect. The autotransformer-effect will be clarified by FIGURE 3A, which shows the load-circuit of the present invention. It will be seen that the load voltage is provided by the composite action of the battery 50 and the secondary-winding 72, as described above, so that the secondary winding provides only a portion of the load voltage. In FIGURE 3B, which shows a load-circuit of the prior-art arrangement, it will be seen that the entire load-voltage is provided by the secondary-winding 32. Thus, the present invention has an autotransformer-effect that is absent from the prior-art circuit, wherein the battery is effectively electrically isolated from the load-circuit.

The advantage of the autotransformer-effect will be understood from the following explanation taken in connection with FIGURE 2. Assume that the load 80 requires 42 volts at 1 ampere, and that the battery provides 28 volts. Under this condition, relative to point 82, and ignoring the minute voltage-drop through the conductive transistor 52, the upper end of the secondary-winding is at a potential of 28 volts (battery potential). In order to raise the potential at the high-potential end of the load to 42 volts, the secondary-winding has to provide only $$42-28=14$$

volts; resulting in reduced insulation requirements accordingly, as compared with the insulation requirements of the prior-art circuit. Moreover, since the upper-portion of the secondary-winding must provide 14 volts, and the upper-portion of the primary-winding has 28 volts across it, the winding ratio is 28:14, or a step-down ratio of 2:1. Since the secondary-winding is to provide a load current of 1 ampere, its power-rating $P=(E)(I)=(14)(1)=14$ watts; and the primary-winding must also have a power rating of 14 watts. The primary-current $$I=P/E=14/28=0.5$$

ampere. Thus, the secondary-winding voltage is 14 volts, the primary-winding current is only 0.5 amperes, their power-ratings are 14 watts, and the battery must provide a current directly to the load of 1 ampere and a primary-winding current of only 0.5 ampere, for a total of 1.5 amperes.

The prior-art circuit, under the same load conditions must do the following. It must produce a secondary-winding voltage of—not 14 volts—but of the full 42 volts. The secondary-winding power $P=(E)(I)=(42)(1)=42$ watts —compared with the 14 watts of the present invention. The primary-winding power-rating, 42 watts at 28 volts, requires a current of $P/E=42/28=1.5$ amperes. Therefore, the prior-art circuit requires the primary winding to handle the full battery current of 1.5 amperes, with more of the battery current being delivered directly to the load.

In summary, the present invention requires a lower power-rated transformer, a smaller primary-winding, a lower-voltage secondary winding, and a smaller cheaper transformer core that has a lower core-loss. These factors provide a smaller, cheaper, lighter, more-efficient, and more-reliable power supply.

The disclosed circuit has another important advantage. The 42 volts across the load comprises 28 volts provided by the battery, and 14 volts provided by the circuit. The battery voltage is, of course, extremely stable. Therefore between oscillations, the output voltage tends to drop from 42 volts to 28 volts—rather than dropping to zero volts as in the prior-art circuit. In actuality, inherent time constants of the circuit deter it from dropping to even 28 volts, so that the "ripple" voltage is so small that the filtering capacitor 46 of the prior-art circuit may be eliminated for many applications.

It should also be noted that the disclosed circuit tends to be self-regulating. If the load is removed, there is no path for providing current to the base-electrode of either transistor; therefore, both transistors are immediately cut off. When a load is applied, the load current "conditions" the base-electrode to permit the transistors to conduct the amount of current necessary for the load. In this way, the self-regulation improves the efficiency versus load characteristic.

Thus, the disclosed circuit is extremely efficient (over 90% efficient, from 10% of rated load to 100% overload), and has a very low ripple voltage.

FIGURE 4 shows another circuit for practicing the present invention, this circuit using NPN transistors. In this drawing and subsequent ones, similar items have similar reference characters that have a prefix that identifies the figure. Thus, in FIGURE 4 transistors 452 and 454 perform the same general function as transistors 52 and 54 of FIGURE 2. The only difference between the circuit of FIGURE 3 and that of FIGURE 2 is that NPN transistors are used, and the battery is reversed. The operation, theory, and advantages are the same as previously discussed.

*A one-transistor embodiment*

FIGURE 5 shows an embodiment that uses only one transistor and a transformer whose core material has a normal hysteresis-loop, as opposed to a square hysteresis-loop. In operation, battery 50 causes an increasing current flow through the emitter-collector path of transistor 552, and this current-flow through the primary-winding 584 induces a current-flow through secondary-winding 586; these currents producing regeneration as previously discussed. It will be recalled that in the previously-discussed embodiments the core became saturated; the inductance decreased; and the current flow was limited by the resistances of the various components. In this embodiment, due to the normal hysteresis curve of the core material, the inductance increases rapidly; and the current flow is limited by the increased inductance and the resistances of the components. As the current reaches its maximum value, it produces an effectively collapsing magnetic field, and therefore induces a voltage of the opposite polarity in the secondary-winding 586. The oppositely-poled voltage cuts off transistor 552; whereupon the initial conditions are re-established and the battery causes the transistor to again become conductive.

It will be noted that in this case the load receives a pulsating D.C. current, which is smoothed out by capacitor 88.

*A high-voltage embodiment*

FIGURE 6 shows a circuit for producing a high-voltage, this being produced by using a high winding-ratio of the primary and secondary windings. In this case the transistors may not be able to withstand the high voltages applied to their base-electrodes. In order to protect the transistors, suitably-poled blocking diodes 90 and 92 are inserted between the secondary-winding of the transformer and the transistor base-electrodes, in order to block the high positive voltage. Since—under this condition, the voltages generated at the secondary winding are blocked by the diodes 90 and 92, and therefore cannot be applied to the base-electrodes as in the previous embodiments—these voltages cannot be used to conductivate, cut off, and condition the transistors as in the previously-discussed embodiments. It turns out that the collector-electrode of the opposite transistor has the necessary polarity for gating the base-electrodes of the given transistor, so capacitive-couplings 94 and 96 are connected between the base of each transistor and the collector of the opposite transistor. These capacitive couplings operate as follows.

Ordinarily, when transistor 652 is conductive and transistor 654 is cut off, base 656 should receive a negative potential; and base 662 should receive a positive potential. However, due to the blocking action of diodes 90 and 92, voltages from the secondary windings are not available.

However, since transistor 654 is not conductive, its collector 666 is effectively connected to the negative-potential end of battery 50; and capacitor 96 applies this negative potential to base 656 of transistor 652. Similarly, since transistor 652 is conductive, its collector 660 is effectively connected to the positive-potential end of battery 50; and capacitor 94 applies this positive potential to base 662 of transistor 654 to hold it non-conductive. In this way, the output of the converter is a high-voltage D.C.; and the oscillation of conductivity is maintained as previously described.

*Another high voltage embodiment*

FIGURE 7 shows another arrangement for producing a high output-voltage. Under some conditions it is necessary to use a low-voltage battery; and therefore an extremely high winding-ratio transformer is necessary to generate the desired load voltage, which may be associated with a very small load current. In this case the transistor may not be capable of responding to the small current present at its base electrode, that is, its "beta" may be too small for satisfactory operation. A so-called "Darlington" configuration 100—as described in Shea, Transistor Circuit Engineering, John Wiley and Sons (1957)—places two transistors in a compound arrangement, so that the overall beta of the compound transistors is satisfactory for the circuit's operation. For convenience, the Darlington circuit will be considered to have a composite base-electrode, a composite emitter-electrode, a composite collector-electrode, a composite emitter-base path, and a composite emitter-collector path; these corresponding to their equivalents in a single transistor. Depending upon the secondary voltage and the type of transistors used, it may be desirable to use blocking diodes 90 and 92. In FIGURE 7, the load current from the secondary-windings 772 and 776 are applied through the respective blocking-diodes 90 and 92 to the composite-base-electrode of the Darlington configurations 100. Here, even though the load current may be quite small, the operation of the Darlington configuration permits the previously-described conditioning, and the compound transistors become conductive in the same manner as previously described. Thus, the load current flows from the battery, through the composite emitter-collector path of the Darlington configuration, through a portion of the secondary-winding, through the load, and back to the battery; this being the equivalent of the current-flow previously described. As discussed in connection with FIGURE 6, the potential at the composite base-electrode of the Darlington configuration is controlled by the action of coupling capacitors 794 and 796, which are connected between the composite base-electrode of one Darlington configuration and the composite-collector-electrode of the other Darlington configuration.

It should be noted that the Darlington configuration inherently divides the secondary voltage between the two compounded transistors, which may thus enable each transistor to withstand its portion of the secondary voltage, without the use of blocking-diodes 90 and 92.

*A composite embodiment*

FIGURE 8 shows a schematic drawing of a circuit used for providing a high-voltage D.C., a high-voltage A.C., and a square-wave waveform for use with a Perkin-Elmer Laser Model 5200; the circuit of FIGURE 8 using a slightly different way of coupling the switching potential to the base of the transistors—the basic circuit being similar to those previously described. In FIGURE 8, a high-winding-ratio transformer produces secondary voltages that are too high to be applied directly to the bases of the transistors. Therefore, blocking diodes 90 and 92 are used as previously explained. In order to provide the desired values of switching potentials, a resistance voltage-divider 102 is connected across the primary-winding; and a suitable-valued conditioning-potential is obtained from the voltage-divider, and is applied through coupling-capacitors 94 and 96 to the base-electrodes of the transistors. Thus, instead of using the particular potential that happens to be available at the collector-electrode, the voltage-divider 102 allows the desired potential to be obtained, and applied to the base-electrodes. It will be noted that the switching potential coupled back from the voltage-divider has the same polarity as though it had been obtained from the collector-electrode. Moreover, in FIGURE 8, the load may be the aforementioned laser, which requires 1400 volts D.C. for operation; and another load, in the form of a voltage-multiplier 106, may be connected between the center-tap of the primary winding and an end of the secondary winding to obtain a 5600 D.C. voltage for initiation of laser operation. If desired, still another A.C. load 104 may be connected directly across the secondary winding—through a switch, if desired, to obtain power for other circuits. In actuality, these latter connections provide a square-wave waveform, which may be used to supply certain A.C. loads, or may be shaped into a sinusoidal waveform if so required.

As previously discussed, removing the D.C. load disables the circuit, so that if A.C. load 104 and/or the voltage-multiplier 106 is to be used without the D.C. load, a bleeder-resistance should replace the load. Under some conditions it may be desirable to associate the bleeder-resistance with one or both of the switches, so that the A.C. load and/or the voltage-multiplier may be used to initiate operation, and the circuit may then be used to provide power for the D.C. load.

Although the invention has been described and illustrated in detail, it is to be clearly understood that the same is by way of illustration and example only and is not to be taken by way of limitation, the spirit and scope of this invention being limited only by the terms of the appended claims.

What is claimed is:
1. The combination comprising:
    a source of D.C. potential;
    a transistor having an emitter-collector path and an emitter-base path;
    a transformer having a primary-winding and a secondary-winding;
    a first output terminal connected to a point of said primary-winding;
    a second output terminal connected to a point of said secondary-winding;
    a circuit-load connected between said output terminals;
    first means for serially connecting a first closed-loop consisting of said potential-source, said emitter-collector path of said transistor, and said primary-winding; and
    second means for serially connecting a second closed-loop consisting of said potential source, said emitter-base path of said transistor, said secondary-winding, and said circuit-load, for causing said potential source to be part of the load circuit.
2. The combination comprising:
    a low-voltage D.C. potential source having two terminals;
    a transistor having an emitter-collector path and an emitter-base path;
    a transformer having a primary-winding and a secondary-winding, and a normal hysteresis-loop core material;
    a first output terminal connected to a point of said primary-winding;
    a second output terminal connected to a point of said secondary-winding;
    circuit-load means, having two load terminals, for utilizing substantially the entire electrical output of said transistors;
    first means for forming a first closed loop, consisting of a connection between one terminal of said potential-source, and said emitter-collector path of said transistor, a connection between said path and one end of said primary-winding; and a connection between said first output terminal and the other terminal of said source; and
    second means for forming a second closed loop, consisting of a connection between one terminal of said potential-source, and said emitter-base path of said transistor, a connection between said path and one end of said secondary-winding, and a connection between said second output terminal and one terminal of said circuit-load, a connection between said other terminal of said circuit-load and said first output terminal, and a connection between said first output terminal and the other terminal of said source, for causing said load to be connected be- tween said output terminals, and for causing said potential source to be part of the load circuit.

3. The combination comprising:
a potential source having first and second terminals,
a first transistor having emitter, collector, and base electrodes;
a second transistor having emitter, collector, and base electrodes;
a transformer having a center-tapped primary-winding and a center-tapped secondary-winding, each of said windings having a first portion and a second portion;
load means for utilizing substantially the entire output of circuit, said load means having two load terminals;
a first closed-loop consisting of a direct connection between said first terminal of said potential-source and said emitter of said first transistor, a direct connection between said collector of said first transistor and one end of said first portion of said primary-winding; and a direct connection between the center-tap of said primary-winding and the second terminal of said source;
a source closed-loop consisting of a direct connection between said first terminal of said potential-source, and said emitter of said second transistor, a direct connection between said collector of said first transistor and one end of said second portion of said primary-winding; and a direct connection between the center-tap of said primary-winding and the second terminal of said source;
a third closed-loop consisting of a direct connection between said first terminal of said potential-source and said emitter of said first transistor, a direct connection between said base of said first transistor and one end of said first-portion of said secondary-winding, a direct connection between the center-tap of said secondary-winding and the first terminal of said load; a direct connection between the second terminal of said load and the center-tap of said primary-winding; and a direct connection between the center-tap of said primary-winding and the second terminal of said source;
a fourth closed-loop consisting of a direct connection between said first terminal of said potential source and said emitter of said second transistor, a direct connection between said base of said first transistor and one end of said second-portion of said secondary-winding, a direct connection between the center-tap of said secondary-winding and the first terminal of said load; a direct connection between the second terminal of said load and the center-tap of said primary-winding; and a direct connection between the center-tap of said primary-winding and the second terminal of said source; to cause said potential source to be part of both load circuits.

4. The circuit of claim 3 wherein said third and fourth closed-loops each includes uni-directional conducting means for block reverse high-voltages, and wherein feedback means is connected between the collector of each transistor and the base of the other.

5. The circuit of claim 4 wherein the feedback means each comprises a capacitor.

6. The circuit of claim 5 wherein the feedback means includes a voltage divider connected across the primary winding and each capacitor is connected to a collector through the divider.

7. The combination comprising:
a source of D.C. potential;
a first transistor having an emitter-collector path and an emitter base path;
a second transistor having an emitter-collector path and an emitter-base path;
a transformer having a center-tapped primary-winding and a center-tapped secondary-winding, each of said windings having a first portion and a second portion;
a load connected between said center-taps;
first means for serially connecting said potential-source, said emitter-collector path of said first transistor, and said first portion of said primary-winding;
second means for serially connecting said potential-source, said emitter-collector path of said second transistor, and said second portion of said primary-winding;
third means for serially connecting said potential-source, said emitter-base path of said first transistor, said first-portion of said secondary-winding, and said load;
fourth means for serially connecting said potential-source, said emitter-base path of said second transistor, said second-portion of said secondary-winding, and said load; and
an A.C. load connected across said secondary-winding.

8. The combination comprising:
a source of low-voltage D.C. potential;
a first transistor having an emitter-collector path and an emitter-base path;
a second transistor having an emitter-collector path and an emitter-base path;
a transformer having a center-tapped primary-winding and a center-tapped secondary-winding each of said windings having a first portion and a second portion;
a load connected between said center-taps;
first means for serially connecting said potential-source, said emitter-collector path of said first transistor, and said first portion of said primary-winding;
second means for serially connecting said potential-source, said emitter-collector path of said second transistor, and said second portion of said primary-winding;
third means for serially connecting said potential-source, said emitter-base path of said first transistor, said first-portion of said secondary-winding, and said load;
fourth means for serially connecting said potential-source, said emitter-base path of said second transistor, said second-portion of said secondary-winding, and said load; and
a second load connected between the center-tap of said primary-winding and one end of said secondary-winding.

9. The combination comprising:
a source of D.C. potential;
a first transistor having an emitter-collector path and an emitter-base path;
a second transistor having an emitter-collector path and an emitter-base path;
a transformer having a center-tapped primary-winding and a center-tapped secondary-winding each of said windings having a first portion and a second portion;
a D.C. load connected between said center-taps;
a first blocking-diode;
a second blocking-diode;
first means for serially connecting said potential-source, said emitter-collector path of said first transistor, and said first portion of said primary-winding;
second means for serially connecting said potential-source, said emitter-collector path of said second transistor, and said second portion of said primary-winding;
third means for serially connecting said potential-source, said emitter-base path of said first transistor, said first blocking-diode, said first-portion of said secondary-winding, and said load;
fourth means for serially connecting said potential-source, said emitter-base path of said second transistor, said second blocking-diode, said second-portion of said secondary winding, and said load;
a first coupling capacitor;
a second coupling capacitor;
means for connecting said first coupling capacitor between the collector of said first transistor and the base of said second transistor; and
means for connecting said second coupling-capacitor between the collector of said second transistor and the base of said first transistor.

10. The combination comprising:
a source of D.C. potential;
a first transistor having an emitter-collector path and an emitter-base path;
a second transistor having an emitter-collector path and an emitter-base path;
a transformer having a center-tapped primary-winding and a center-tapped secondary-winding each of said windings having a first portion and a second portion;
a D.C. load connected between said center-taps;
a first blocking-diode;
a second blocking-diode;
first means for serially connecting said potential-source, said emitter-collector path of said first transistor, and said first portion of said primary-winding;
second means for serially connecting said potential-source, said emitter-collector path of said second transistor, and said second portion of said primary-winding;
third means for serially connecting said potential-source, said emitter-base path of said first transistor, said first blocking-diode, said first-portion of said secondary-winding, and said load;
fourth means for serially connecting said potential-source, said emitter-base path of said second transistor, said second blocking-diode, said second-portion of said secondary winding, and said load;
a voltage-divider;
means for connecting said voltage divider across said primary-winding;
a first coupling-capacitor;
a second coupling-capacitor;
means for connecting said first coupling-capacitor between the base of said first transistor and a first point of said voltage-divider; and
means for connecting said second coupling-capacitor between the base of said second transistor and a second point of said voltage-divider.

11. The combination comprising:
a source of D.C. potential;
a first Darlington circuit having a composite emitter-collector path and a composite emitter-base path;
a second Darlington circuit having a composite emitter-collector path and a composite emitter-base path;
a transformer having a center-tapped primary-winding and a center-tapped secondary-winding each of said windings having a first portion and a second portion;
a D.C. load connected between said center-taps;
first means for serially connecting said potential-source, said composite emitter-collector path of said first Darlington circuit, and said first portion of said primary-winding;
second means for serially connecting said potential-source, said composite emitter-collector path of said second Darlington circuit, and said second portion of said primary-winding;
third means for serially connecting said potential-source, said composite emitter-base path of said first Darlington circuit, said first-portion of said secondary-winding, and said load; and
fourth means for serially connecting said potential-source, said composite emitter-base path of said second Darlington circuit, said second-portion of said secondary winding, and said load.

12. The combination comprising:
a source of D.C. potential;
a first Darlington circuit having a composite emitter-collector path and a composite emitter-base path;
a second Darlington circuit having a composite emitter-collector path and a composite emitter-base path;
a transformer having a center-tapped primary-winding and a center-tapped secondary-winding each of said windings having a first portion and a second portion;
a D.C. load connected between said center-taps;
a first blocking-diode;
a second blocking-diode;
first means for serially connecting said potential-source, said composite emitter-collector path of said first Darlington circuit and said first portion of said primary-winding;
second means for serially connecting said potential-source, said composite emitter-collector path of said second Darlington circuit, and said second portion of said primary-winding;
third means for serially connecting said potential-source, said composite emitter-base path of said first Darlington circuit, said first blocking-diode, said first-portion of said secondary-winding, and said load;
fourth means for serially connecting said potential-source, said composite emitter-base path of said second Darlington circuit, said second blocking-diode, said second-portion of said secondary winding, and said load;
a first coupling-capacitor connected between the composite collector-electrode of said first Darlington circuit and the composite base electrode of said second Darlington circuit; and
a second coupling-capacitor connected between the composite collector-electrode of said second Darlington circuit and the composite base electrode of said first Darlington circuit.

13. The combination comprising:
a source of D.C. potential;
a first transistor having an emitter-collector path and an emitter-base path;
a second transistor having an emitter-collector path and an emitter-base path;
a transformer having a center-tapped primary-winding and a center-tapped secondary-winding each of said windings having a first portion and a second portion;
a D.C. load connected between said center-taps;
a first blocking-diode;
a second blocking-diode;
first means for serially connecting said potential-source, said emitter-collector path of said first transistor, and said first portion of said primary-winding;
second means for serially connecting said potential-source, said emitter-collector path of said second transistor, and said second portion of said primary-winding;
third means for serially connecting said potential-source, said emitter-base path of said first transistor, said first blocking-diode, said first-portion of said secondary-winding, and said load;
fourth means for serially connecting said potential-source, said emitter-base path of said second transistor, said second blocking-diode, said second-portion of said secondary-winding, and said load;
a voltage-divider connected across said primary-winding;
a first coupling-capacitor connected between the base of said first transistor and a first point of said voltage-divider;
a second coupling-capacitor connected between the base of said second transistor and a second point of said voltage-divider;
means for connecting an A.C. load across said secondary winding; and
means for connecting another load between the center-tap of said primary-winding and one end of said secondary-winding.

14. The combination comprising:
a transistor having an emitter, a collector, and a base;

a transformer having a primary-winding and a secondary-winding;
a source of potential;
a load;
a direct connection between said collector and a first end of said primary-winding;
a direct connection between a point on said primary-winding and the first terminal of said source;
a direct connection between the second terminal of said source and said emitter;
a direct connection between said base and the first end of said secondary-winding;
a direct connection between a point on said secondary-winding and a first terminal of said load; and
a direct connection between the second terminal of said load and said point of said primary-winding.

15. The combination comprising:
a first transistor having an emitter, a collector, and a base;
a transformer having a center-tapped primary-winding and a center-tapped secondary-winding;
a source of potential;
a load;
a direct connection between said collector of said first transistor and the first end of said primary-winding;
a direct connection between the center-tap of said primary-winding and the first terminal of said source;
a direct connection between the second terminal of said source and said emitter of said first transistor;
a direct connection between said base of said first transistor and the first end of said secondary-winding;
a direct connection between the center tap of said secondary-winding and a first terminal of said load;
a direct connection between the second terminal of said load and the center tap terminal of said primary-winding;
a second transistor having an emitter, a collector, and a base;
a direct connection between said collector of said second transistor and the second end of said primary-winding;
a direct connection between said base of said second transistor and the second end of said secondary-winding; and
a direct connection between the second terminal of said source and the emitter of said second transistor.

References Cited

UNITED STATES PATENTS

| | | | |
|---|---|---|---|
| 2,891,192 | 6/1959 | Goodrich | 331—111 |
| 3,149,291 | 9/1964 | Massey | 331—113.1 |
| 3,267,349 | 8/1966 | Krause | 331—113.1 |

FOREIGN PATENTS

| | | |
|---|---|---|
| 194,622 | 6/1964 | Sweden. |

JOHN KOMINSKI, *Primary Examiner.*